United States Patent [19]

Huang

[11] 3,943,841
[45] Mar. 16, 1976

[54] CONDITIONING THE AIR OF A SMOKEHOUSE OR THE LIKE

[75] Inventor: Min-Nang Huang, Madison, Wis.

[73] Assignee: DEC International, Inc., Madison, Wis.

[22] Filed: Mar. 24, 1975

[21] Appl. No.: 561,232

[52] U.S. Cl. .................. 99/470; 99/331; 99/352
[51] Int. Cl.² ........................................ A23B 4/04
[58] Field of Search .................. 99/467, 468–469, 99/470, 473–474, 476, 331, 346, 352, 447; 126/59.5; 426/312, 314–315

[56] References Cited
UNITED STATES PATENTS

| 275,145 | 4/1883 | Chase | 99/470 X |
|---|---|---|---|
| 1,068,272 | 7/1913 | Rayson | 99/470 |
| 1,250,934 | 12/1917 | Legg | 99/470 X |
| 2,060,992 | 11/1936 | Jackson | 99/346 |
| 2,374,425 | 4/1945 | DeWeerth | 99/470 X |
| 2,790,380 | 4/1957 | Shryack | 99/447 X |
| 3,199,436 | 8/1965 | Rasmussen et al. | 99/331 |
| 3,313,630 | 4/1967 | Harvey, Jr. | 426/314 |
| 3,345,181 | 10/1967 | Smith, Jr. | 426/314 |
| 3,805,686 | 4/1974 | West | 99/352 |

Primary Examiner—Stanley N. Gilreath
Assistant Examiner—Arthur O. Henderson
Attorney, Agent, or Firm—Darbo, Robertson & Vandenburgh

[57] ABSTRACT

Air withdrawn from a food smokehouse is divided into two branches. The air in one of the branches enters a chamber in which is a bladed air agitator. The chamber includes two water sprays with the water contacting the air and the blades. From that chamber the air sequentially passes through a cyclone separator and a demister. The air from the two branches is then recombined. After being recombined, the air passes through a heater and a humidifier. Part of the recombined air also may pass through a smoke generator.

22 Claims, 2 Drawing Figures

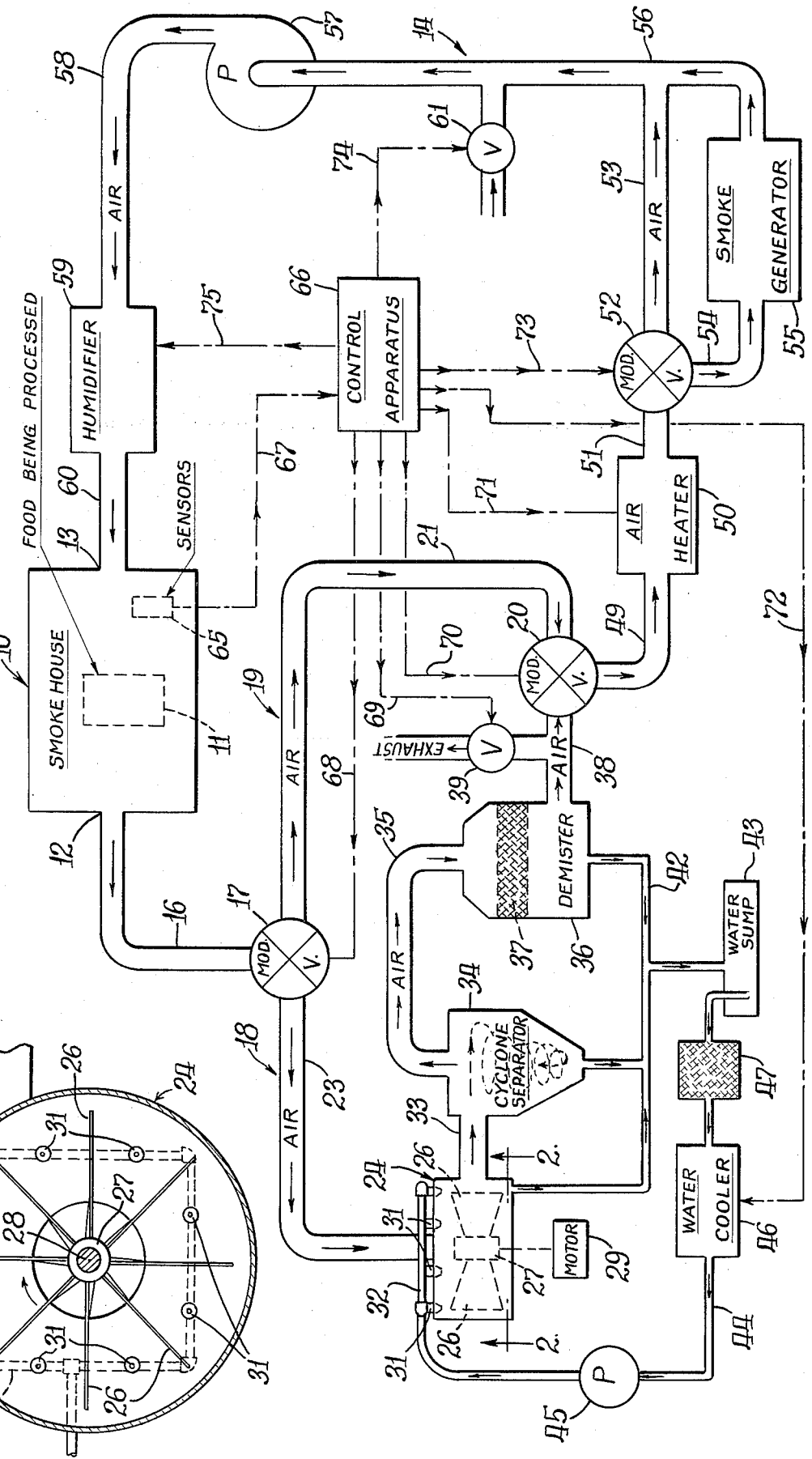

CONDITIONING THE AIR OF A SMOKEHOUSE OR THE LIKE

BACKGROUND AND SUMMARY OF THE INVENTION

Some food processing requires the food to be cooked under controlled humidity and temperature conditions. A "smokehouse" for the processing of ham, bacon and the like is exemplary. As the food is cooked, it gives off moisture which acts to increase the humidity in the processing chamber. The conventional procedure has been to exhaust part of the air from the processing chamber to atmosphere while admitting ambient air so as to lower the humidity in the processing chamber to the desired condition. WIth the advent of concern for air pollution, this conventional procedure has been a problem, particularly in a smokehouse in which smoke is present to produce desired flavor and appearance results in the food. Discharging that smoke to atmosphere became undesirable.

One solution (see U.S. Pat. No. 3,199,436) was to heat the air before it was discharged to atmosphere to a sufficiently high temperature to oxidize the smoke. This has not been a completely satisfactory solution because it increases the heat pollution of the atmosphere and results in increased energy (heat) consumption.

Another proposal (see U.S. Pat. No. 3,805,686) has been to remove moisture laden air from the smokehouse, lower the temperature of that removed air to below its dew point to thereby extract water therefrom and thereafter return that lower humidity air to the smokehouse. The smokehouse humidity is controlled by varying the amount of air withdrawn from the smokehouse. Thus if little humidity reduction is required for the air in the smokehouse, only little air is withdrawn and dehumidified before its return to the smokehouse; while if a substantially large humidity reduction is required, a large amount of air is withdrawn, dehumidified and returned. While this avoids discharging smokehouse air to atmosphere, it creates a problem in smokehouse operation. It is important in smokehouse operation to have substantially uniform air flow, and air conditions, throughout the smokehouse at all times. Otherwise, the foods in various parts of the smokehouse are not processed uniformly since they are being subjected to different processing conditions depending upon their location. Modulating the amount of the air that is withdrawn, dehydrated and reinjected into the smokehouse will vary the airflow patterns and air conditions in different parts of the smokehouse.

In the present invention a closed system is employed so as to obtain the advantage of not discharging smokehouse air to atmosphere, but at the same time the airflow through the smokehouse is maintained constant. Thus the smokehouse operator can be sure that once he has established airflow patterns in the smokehouse to achieve uniform conditions therein, these airflow patterns will not be changed by a variance in the quantity of air being circulated. In the present invention this is done by dividing the air in the air circulation system into two streams. One of these streams is dehumidified while the other is not. Before the streams are reintroduced into the smokehouse they are recombined. Thus instead of changing the quantity of the total airflow, the proportion of the airflow to be dehumidified is varied so as to vary the overall amount of dehumidification in accordance with the varying requirements of the smokehouse.

Another feature of the present invention resides in the apparatus employed for dehumidification of the partial stream of air that is subjected to dehumidification. This partial stream is first introduced into a turbo-exchanger which achieves a high degree of contact between cool water and the air, as well as the contact between the air and relatively large surface areas also cooled by the water. From the turbo-exchanger the air passes sequentially through a cyclone separator and a demister, the combination of which is extremely effective in extracting substantially all water particles from the air stream. Obviously, if there is a carry over of water particles in the air stream, this reduces the effectiveness of the dehumidification process. A further advantage of this turbo-exchanger and the cyclone is the degree of efficiency achieved in the extraction of smoke particles from the air passing therethrough.

When the smokehouse is to be opened for the removal of food therefrom and the insertion of a new batch of food to be processed, it is important that the smoke in the smokehouse, and the system generally, not be discharged to atmosphere. Through the use of the present invention, the air in the smokehouse and the system can be purged of smoke before the smokehouse is opened.

Further objects and advantages of the invention will be apparent from the following description taken in conjunction with the drawings.

DESCRIPTION OF THE DRAWINGS

FIG. 1 is a schematic illustration of an embodiment of the invention; and

FIG. 2 is a section of the turbo-exchanger as seen at line 2—2 of FIG. 1.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

FIG. 1 illustrates a smokehouse, generally 10, in which there is food 11 to be processed. Communicating with the smokehouse at an exhaust connection 12 and at an intake connection 13 is a closed air conduit means, generally 14, through which the air of the smokehouse is withdrawn, conditioned and returned to the smokehouse. The form of these connections with the smokehouse are diagrammatic and form no part of the present invention. One of the various forms of connection known to the art for obtaining uniformity of air distribution and airflow within the smokehouse would be employed.

From the exhaust connection 12 the air flows through a duct 16 to a modulating valve 17. At this point the air stream is divided into two branches, generally 18 and 19. The two branches are recombined at a modulating valve 20. Branch 19 comprises only a single duct 21.

Branch 18 includes a duct 23 leading from valve 17 to a turbo-exchanger, generally 24. This turbo-exchanger includes a housing 25. Within the housing is an air agitator comprising blades 26 extending in radial planes from a hub 27. Hub 27 is secured to a shaft 28.

The shaft is connected to a motor 29 which rotates the air agitator. A plurality of water spray nozzles 31 extend into the housing 25 to direct sprays of water into the housing to contact the air therein as well as to contact the blades 26. These nozzles are connected to a manifold 32.

Housing 25 exhausts through a duct 33 into the intake of a cyclone separator 34. From the exhaust of the cyclone separator a duct 35 directs the air into the intake of a demister 36. The cross-sectional area within demister 36 is quite large as compared to the cross-sectional areas of the ducts, e.g., 35. Thus the airflow through a unit of cross-sectional area in the demister is comparatively slow. Within the demister is a unit in the nature of a filter 37 which serves to extract particles of water from the air. Such units are known in the art as, for example, the products sold by Diversified Metal Products, Inc. under the trademark DIVMET. The exhaust from the demister enters a duct 38 leading to modulating valve 20 and to an exhaust valve 39. When valve 39 is open the air from the demister is exhausted to atmosphere.

A water drain conduit leads to a sump 43 from turbo-exchanger 24, cyclone separator 34 and demister 36. From the sump 43 a water conduit 44 leads to spray nozzle manifold 32. Water conduit 44 includes a pump 45 to supply the water from the sump to the nozzles 31 under pressure, a water cooler 46 and a filter 47. The latter two items filter and cool the water before it arrives at the spray nozzles 31.

From modulating valve 20 the recombined air stream passes through a duct 49 to a heater 50. A duct 51 carries the air from heater 50 to a modulating valve 52 which directs the air into ducts 53 and 54, as desired. Duct 54 communicates with a smoke generator 55 which, like duct 53, discharges into a duct 56. Duct 56 communicates with the intake of a pump or blower 57. Duct 56 also communicates with an intake valve 61, the other side of which is open to ambient air for those occasions in which it is desired to draw air into the system. A duct 58 connects the outlet of blower 57 to a humidifier 59. Humidifier 59 communicates with intake opening 13 of the smokehouse through a duct 60.

Within the smokehouse 10 are wet and dry bulb sensors 65 to ascertain the temperature and humidity conditions in the smokehouse. This information is relayed to an automatic control apparatus 66, as indicated by lines 67. In accordance with a predetermined program (and the smokehouse conditions determined by sensors 65), the automatic control apparatus controls the operation of modulating valve 17, exhaust valve 39, modulating valve 20, air heater 50, water cooler 46, modulating valve 52, intake valve 61 and humidifier 59, as indicated by lines 68-75, respectively. The general type of such automatic control apparatus is described in U.S. Pat. No. 3,440,950, although there used for a somewhat different smokehouse system.

OPERATION

A constant volume of airflow is maintained through air conduit means 14. Upon arriving at modulating valve 17 the air being withdrawn from the smokehouse is divided between branches 18 and 19. If the air in the smokehouse requires but little dehumidification, the proportion of air through branch 18 is comparatively small and the major portion of the total airflow passes through branch 19. For example, if it is desired to maintain a relative humidity of twenty-five percent and a dry bulb temperature of 100°F. in the smokehouse at a particular part of the processing cycle, it would be necessary that only about ten percent of the recirculating air go through the branch 18. The remaining ninety percent of the air would pass through branch 19. Since only ten percent of the air is being cooled, the amount of heat that must be replaced by the air heater 50 is significantly smaller than is the case when one hundred percent of the air passes through the dehumidifying branch 18. Conversely, if the sensors 65 determine that the humidity in the smokehouse is substantially in excess of that desired for the particular phase of the smokehouse operation, the control apparatus 66 sets modulating valves 17 and 20 so that the airflow through branch 18 is comparatively higher and that through branch 19 is comparatively lower. Similarly, if the processing is at a phase at which the amount of smoke in the smokehouse is to be significantly reduced or eliminated, the control apparatus would dictate a relatively high flow of air through branch 18 so that the air would be washed free of smoke.

In any event, the air of branch 18 is cleaned and/or dehumidified. If it is only to be cleaned, the control apparatus 66 would dictate that the water cooler 46 become inoperative. If the air is to be dehumidified the water cooler 46 would be operative to chill the water to a temperature below the dew point of the air being withdrawn from the smokehouse at exhaust connection 12. The water sprays from nozzles 31 not only directly contact the air in housing 25 but also chill the impeller blades 26. These blades present a large surface area for contact with the air. Thus by maintaining these blades in a cool condition they serve to cool the air by contact therewith. Furthermore, the water flung off these blades by centrifugal force provide a secondary spray for contact with the air. Thus the turbo-exchanger does a very effective job of washing and/or cooling the air. Of course, cooling the air below its dew point causes water to be extracted therefrom in the form of water particles (mist and/or drops).

A substantial amount of the water in the turboexchanger will flow out through drain 42. However, a significant amount of the water particles will be entrained in the airflow flowing through discharge duct 33. Were this air to be reheated without the entrained water particles first being extracted thereform, those water particles would evaporate and again increase the water content (humidity) of the air. The extracted water also carries off other contaminates, e.g., smoke particles. The cyclone separator 34 is effective to remove the majority of the entrained water particles from the air. As a precaution against the failure of the cyclone separator to extract substantially all water particles from the air, the demister 36 is employed as a secondary extractor. By using the cyclone separator ahead of the demister, the extraction load on the demister is greatly decreased. There will be very little entrained water particles after the air leaves the demister in duct 38.

After the two air streams are recombined at modulating valve 20, the air is then heated by heater 50 to the temperature required by the desired processing conditions in the smokehouse. In some instances, conventional smokehouses include air heaters directly within the smokehouse. Air heater 50 can then be used merely as a supplement to temper the circulating air before it is reintroduced into the smokehouse. Some processors may prefer to have only the air heater in the smokehouse, in which case air heater 50 could be utilized there rather than between ducts 49 and 51.

In the processing stages in which smoke is to be present in the smokehouse, the control apparatus actuates valve 52 so that at least part of the air stream enters duct 54 and passes through smoke generator 55. Otherwise, all of the air stream is directed through duct 53. After leaving the blower 57, the air passes through humidifier 59 before reentering the smokehouse. During those parts of the processing operation in which it is necessary to extract humidity from the air, it will undoubtedly not be necessary to operate humidifier 59 to add water to the air. However, certainly at some stages the processor is likely to desire more humidity in the smokehouse than that present therein. For example, at the inital stages of the processing operation the humidity in the smokehouse may be relatively low due to the fact that ambient air was initially present and the food has not been cooked sufficiently to vaporize much of the water therein. At such stages, the control apparatus would operate the humidifier to add moisture to the air sufficient to raise the humidity to the required level.

Before opening the smokehouse at the end of the processing operation, the control apparatus would open valves 39 and 61 and direct all (or substantially all) of the airflow through duct 18. Thus air would be withdrawn from the smokehouse at exhaust connection 12 and washed in branch 18 before being discharged to atmosphere through valve 39. Unless heat pollution control were important, water cooler 46 would be shut down during this part of the cycle. The opening of valve 61 permits fresh air to enter the system to replace the air being extracted. Thus the smokehouse would be purged of its smoke laden air. When that purging is completed, the system would be shut down and the processor could open the smokehouse for the removal of the food already processed and its replacement by unprocessed food.

I claim:

1. In an apparatus for conditioning the air in a food processing chamber means, such as a smokehouse, which apparatus includes air conduit means communicating with the smokehouse at an exhaust connection and an intake connection and through which the air to be conditioned is withdrawn from the chamber means at the exhaust connection and through which the air after conditioning is returned to the chamber means at the intake connection, said conduit means including a device which reduces the temperature of withdrawn air, at least one of said means including an air heating device for maintaining the air temperature in said chamber means at food processing temperature, the improvement comprising:

at least part of said conduit means between said connections including two branches and modulating valve means for establishing the proportions of the total amount of withdrawn and returned air which passes through each of said branches;

said air temperature reducing device being in one of said branches;

whereby the amount of the air subjected to temperature reduction may be varied without varying the total amount of withdrawn and returned air.

2. In an apparatus as set forth in claim 1, wherein said temperature reducing device reduces the temperature of the air in said one branch below the dew point to thereby remove moisture thereform.

3. In an apparatus as set forth in claim 2, wherein said temperature reducing device comprises means for contacting the air in said one branch with water having a temperature lower than the temperature of the air exhausted from the smokehouse.

4. In an apparatus as set forth in claim 3, wherein said one branch of said conduit means includes, downstream from said temperature reducing device, means for seperation of water particles from the air.

5. In an apparatus as set forth in claim 4, wherein said separation means includes a cyclone separator.

6. In an apparatus as set forth in claim 5, wherein said separation means includes a demister downstream from said cyclone separator.

7. In an apparatus as set forth in claim 6, wherein said temperature reducing device includes a housing, air agitating means in said housing and rotatable with respect to said housing, said air agitating means having blades, power means connected to said air agitating means for rotating the same, and a plurality of water spray means in said housing for introducing sprays of water into said housing, said spray means directing at least part of the sprays of water onto said blades.

8. In an apparatus as set forth in claim 7,
wherein said housing, said separator and said demister include drain means; and
including water conduit means connected to said drain means and to said nozzle means for returning the water from said drain means to said nozzle means under pressure, said water conduit means including a pump, a filter and water cooler means.

9. In an apparatus as set forth in claim 1, wherein said temperature reducing device comprises means for washing the air in said one branch with water.

10. In an apparatus as set forth in claim 9, wherein said one branch of said conduit means includes, downstream from said temperature reducing device, means for separation of water particles from the air.

11. In an apparatus as set forth in claim 10, wherein said separation means includes a cyclone separator.

12. In an apparatus as set forth in claim 11, wherein said separation means includes a demister downstream from said cyclone separator.

13. In an apparatus as set forth in claim 12, wherein said temperature reducing device includes a housing, air agitating means in said housing and rotatable with respect to said housing, said air agitating means having blades, power means connected to said air agitating means for rotating the same, and a plurality of water spray means in said housing for introducing sprays of water into said housing, said spray means directing at least part of the sprays of water onto said blades.

14. In an apparatus as set forth in claim 13,
wherein said housing, said separator and said demister include drain means; and
including water conduit means connected to said drain means and to said nozzle means for returning the water from said drain means to said nozzle means under pressure, said water conduit means including a pump and a filter.

15. In an apparatus as set forth in claim 14,
wherein said valve means has a setting at which all of the air from said exhaust connection is directed through said one branch; and
said air conduit means includes valve means downstream from said demister for opening said one branch to atmosphere;

whereby the air may be withdrawn from the smokehouse, washed, have the water particles extracted and thereafter exhausted to atmosphere.

16. In an apparatus as set forth in claim 9, wherein said valve means has a setting at which all of the air from said exhaust connection is directed through said one branch; and said air conduit means includes valve means downstream from said air washing device for opening said one branch to atmosphere;

whereby the air may be withdrawn from the smokehouse, washed and thereafter exhausted to atmosphere.

17. In an apparatus for conditioning the air in a food processing chamber means, such as a smokehouse, which apparatus includes air conduit means communicating with the smokehouse at an exhaust connection and an intake connection and through which the air to be conditioned is withdrawn from the chamber means at the exhaust connection and through which the air after conditioning is returned to the chamber means at the intake connection, said conduit means including a device for contacting the air with water for conditioning the air, the improvement wherein said device comprises:

a housing, air agitating means in said housing and rotatable with respect to said housing, said air agitating means having blades, power means connected to said air agitating means for rotating the same, and a plurality of water spray means in said housing for introducing sprays of water into said housing, said spray means directing at least part of the sprays of water onto said blades.

18. In an apparatus as set forth in claim 17, wherein said conduit means includes, downstream from said housing, means for separation of water particles from the air.

19. In an apparatus as set forth in claim 18, wherein said separation means includes a cyclone separator.

20. In an apparatus as set forth in claim 19, wherein said separation means includes a demister downstream from said cyclone separator.

21. In an apparatus for conditioning the air in a food processing chamber means, such as a smokehouse, which apparatus includes air conduit means communicating with the smokehouse at an exhaust connection and an intake connection and through which the air to be conditioned is withdrawn from the chamber means at the exhaust connection and through which the air after conditioning is returned to the chamber means at the intake connection, said conduit means including a device for contacting the air with water for conditioning the air, the improvement comprising:

said conduit means including, downstream from said device, means for separation of water particles from the air, said separation means including a cyclone separator.

22. In an apparatus as set forth in claim 21, wherein said separation means includes a demister downstream from said cyclone separator.

* * * * *

UNITED STATES PATENT OFFICE
CERTIFICATE OF CORRECTION

PATENT NO. : 3,943,841
DATED : March 16, 1976
INVENTOR(S) : Min-Nan Huang

It is certified that error appears in the above-identified patent and that said Letters Patent are hereby corrected as shown below:

```
Inventor:   "Min-Nang" should read --Min-Nan--.
Column 1, line 16, "WIth" should read --With--.
Column 3, line 34, "and" should read --or--.
Column 4, lines 42-43, "turboexchanger" should read
--turbo-exchanger--.
Column 6, line 9, "seperation" should read --separation--.
```

Signed and Sealed this twenty-ninth Day of June 1976

[SEAL]

Attest:

RUTH C. MASON
*Attesting Officer*

C. MARSHALL DANN
*Commissioner of Patents and Trademarks*